US012327307B2

United States Patent
Kawamura et al.

(10) Patent No.: US 12,327,307 B2
(45) Date of Patent: Jun. 10, 2025

(54) INFORMATION PROCESSING APPARATUS, INFORMATION PROCESSING METHOD, AND PROGRAM

(71) Applicant: Sony Interactive Entertainment Inc., Tokyo (JP)

(72) Inventors: Daisuke Kawamura, Tokyo (JP); Erika Ohno, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 43 days.

(21) Appl. No.: 17/783,757

(22) PCT Filed: Dec. 17, 2019

(86) PCT No.: PCT/JP2019/049424
§ 371 (c)(1),
(2) Date: Jun. 9, 2022

(87) PCT Pub. No.: WO2021/124451
PCT Pub. Date: Jun. 24, 2021

(65) Prior Publication Data
US 2023/0005207 A1    Jan. 5, 2023

(51) Int. Cl.
*G06T 13/80*    (2011.01)
(52) U.S. Cl.
CPC .......... *G06T 13/80* (2013.01); *G06T 2200/24* (2013.01)
(58) Field of Classification Search
CPC .................... G06T 13/80; G06T 2200/24
See application file for complete search history.

(56) References Cited

U.S. PATENT DOCUMENTS

| 9,829,706 B2 | 11/2017 | Ishikawa |
| 2002/0033848 A1* | 3/2002 | Sciammarella ....... G06F 3/0485 715/838 |
| 2010/0245651 A1* | 9/2010 | Minamino ................ G06T 3/40 348/333.12 |

(Continued)

FOREIGN PATENT DOCUMENTS

| JP | 2010009368 A | 1/2010 |
| JP | 2011175323 A | 9/2011 |

(Continued)

OTHER PUBLICATIONS

International Search Report for corresponding PCT Application No. PCT/JP2019/049424, 4 pages, dated Mar. 17, 2020.

*Primary Examiner* — Yu Chen
(74) *Attorney, Agent, or Firm* — Kilpatrick Townsend & Stockton LLP (57) ABSTRACT

An information processing apparatus determines a target state of a display element after transition, which is displayed on a screen of a display apparatus, according to an operation of a user, and displays a transition moving image that indicates a procedure of change of the display element from the initial state to the determined target state. The transition moving image includes a procedure of change of the display element from the initial state to a first intermediate state and a procedure of change of the display element from a second intermediate state to the target state and does not include a procedure of change of the display element from the first intermediate state to the second intermediate state.

9 Claims, 6 Drawing Sheets

(56) References Cited

U.S. PATENT DOCUMENTS

| | | | |
|---|---|---|---|
| 2011/0154196 A1* | 6/2011 | Icho | G06F 3/0488 |
| | | | 715/702 |
| 2015/0228054 A1* | 8/2015 | Takimoto | G06F 3/0488 |
| | | | 345/672 |
| 2015/0243067 A1* | 8/2015 | Ishikawa | G06F 1/163 |
| | | | 345/473 |
| 2015/0302665 A1* | 10/2015 | Miller | G06F 3/016 |
| | | | 345/419 |

FOREIGN PATENT DOCUMENTS

| JP | 2014140104 A | 7/2014 |
|---|---|---|
| JP | 2015158748 A | 9/2015 |

\* cited by examiner

INFORMATION PROCESSING APPARATUS, INFORMATION PROCESSING METHOD, AND PROGRAM

TECHNICAL FIELD

The present invention relates to an information processing apparatus, an information processing method, and a program that cause a moving image which indicates a manner in which a display element transits to be displayed.

BACKGROUND ART

An information processing apparatus sometimes causes various elements displayed on a screen to transit from a state (initial state) in which the display elements are currently displayed to another state (target state) according to an instruction of a user. For example, such control as to move a window that is displayed in a partial region in a screen to a different location or to display, in a case where one of a plurality of images is selected by a user, the selected image in a magnified state is performed. In such a case, in order to clearly indicate to the user what transition has been performed, instead of erasing a display element in an initial state and suddenly displaying a target state after transition, a moving image (animation) that indicates a procedure in which the display element gradually transits from the initial state to the target state is sometimes displayed.

SUMMARY

Technical Problem

According to the conventional technology described above, a user can intuitively grasp that a display element has transmitted from an initial state to a target state. However, on the other hand, if the entire procedure in which a state transits gradually is displayed, an impression that time is required until a target state is displayed is given to the user, and the user sometimes feels that the responsiveness to an operation is low.

The present invention has been made taking the situation described above into consideration, and one of its objects is to provide an information processing apparatus, an information processing method, and a program which are capable of presenting, to a user, in an easy-to-understand manner, a transition which has been performed without impairing the operation feeling of the user, in a case in which a display element on a screen is caused to transit to another state.

Solution to Problem

The information processing apparatus according to an aspect of the present invention is an information processing apparatus in which a display element displayed on a screen of a display apparatus is caused to transit from an initial state to a target state, including a display element controlling unit that determines a target state of the display element after transition according to an operation of a user, and a transition moving image displaying unit that displays a transition moving image that indicates a procedure of change of the display element from the initial state to the determined target state, in which the transition moving image is a moving image that includes a procedure of change of the display element from the initial state to a first intermediate state and a procedure of change of the display element from a second intermediate state to the target state and that does not include a procedure of change of the display element from the first intermediate state to the second intermediate state.

The information processing method according to another aspect of the present invention is an information processing method for moving a display element displayed on a screen of a display apparatus to cause the display element to transit from an initial state to a target state, including a step of determining a target state of the display element after transition according to an operation of a user, and a step of displaying a transition moving image that indicates a procedure of change of the display element from the initial state to the determined target state, in which the transition moving image is a moving image that includes a procedure of change of the display element from the initial state to a first intermediate state and a procedure of change of the display element from a second intermediate state to the target state and that does not include a procedure of change of the display element from the first intermediate state to the second intermediate state.

The program according a further aspect of the present invention is a program for moving a display element displayed on a screen of a display apparatus to cause the display element to transit from an initial state to a target state, the program causing a computer to execute a step of determining a target state of the display element after transition according to an operation of a user, and a step of displaying a transition moving image that indicates a procedure of change of the display element from the initial state to the determined target state, in which the transition moving image is a moving image that includes a procedure of change of the display element from the initial state to a first intermediate state and a procedure of change of the display element from a second intermediate state to the target state and that does not include a procedure of change of the display element from the first intermediate state to the second intermediate state. This program may be stored in a non-transitory computer readable information storage medium and provided.

DESCRIPTION OF EMBODIMENT

In the following, an embodiment of the present invention is described in detail with reference to the drawings.

Figure 1:
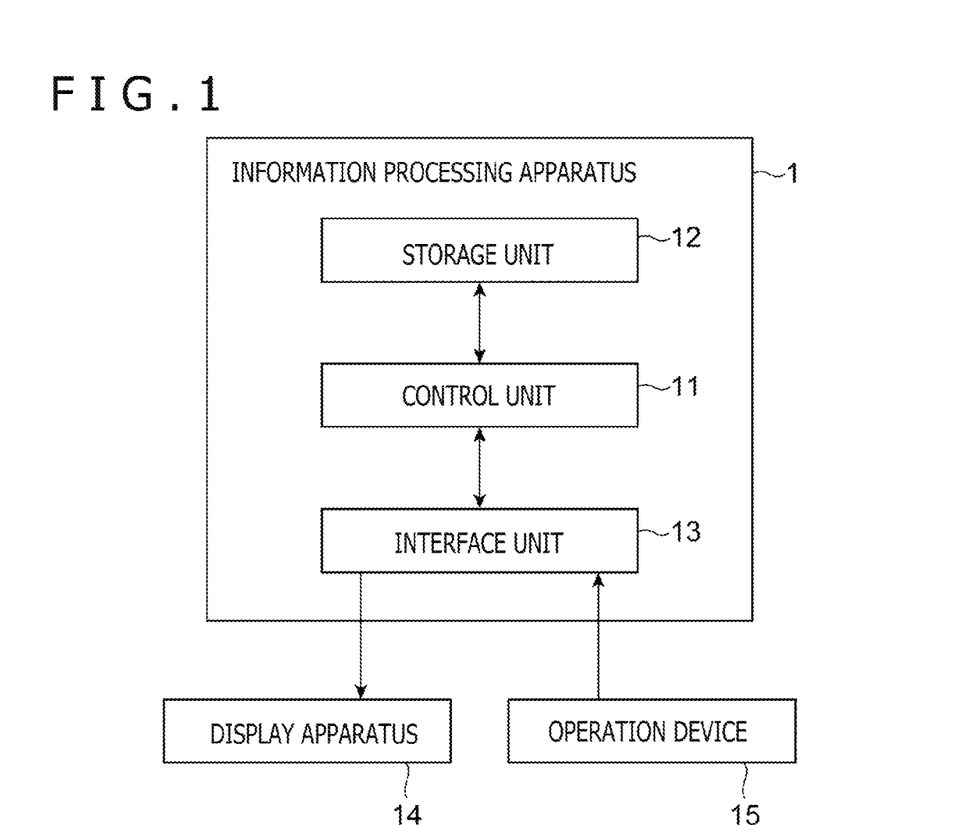
FIG. 1 is a configuration block diagram depicting a configuration of an information processing apparatus according to an embodiment of the present invention.

FIG. 1 is a configuration block diagram depicting a configuration of an information processing apparatus 1 according to an embodiment of the present invention. The information processing apparatus 1 is, for example, a game machine for home use, a portable game machine, a personal computer, a smartphone, a tablet, or the like and includes a control unit 11, a storage unit 12 and an interface unit 13 as depicted in FIG. 1. In addition, the information processing apparatus 1 is connected to a display apparatus 14 and an operation device 15.

The control unit 11 includes at least one processor such as a central processing unit (CPU) and executes a program stored in the storage unit 12 to execute various kinds of information processing. It is to be noted that particular examples of processing executed by the control unit 11 in the present embodiment are hereinafter described. The storage unit 12 includes at least one memory device such as a random access memory (RAM), and stores programs to be executed by the control unit 11 and data to be processed by the programs.

The interface unit 13 is an interface for data communication with the display apparatus 14 and the operation device 15. The information processing apparatus 1 is connected to each of the display apparatus 14 and the operation device 15 by wired connection or wireless connection through the interface unit 13. In particular, the interface unit 13 is assumed to include a multimedia interface such as High-Definition Multimedia Interface (HDMI) (registered trademark) in order to transmit video data supplied from the information processing apparatus 1 to the display apparatus 14. Further, the interface unit 13 includes a data communication interface such as a universal serial bus (USB) in order to receive a signal indicative of contents of an operation performed for the operation device 15 by a user.

The display apparatus 14 is a liquid crystal display, an organic electro-luminescence display, or the like and displays an image according to a video signal supplied thereto from the information processing apparatus 1 on a screen thereof. The operation device 15 is, for example, a keyboard, a mouse, a controller of a game machine for home use, or the like and accepts an operation input from a user. It is to be noted that the display apparatus 14 and the operation device 15 may each be built in a housing of the information processing apparatus 1 or may be apparatus separated from the information processing apparatus 1 and connected by wired connection or wireless connection to the information processing apparatus 1. The operation device 15 may include push buttons or a touch panel placed on the surface of the housing of the information processing apparatus 1.

Figure 2:
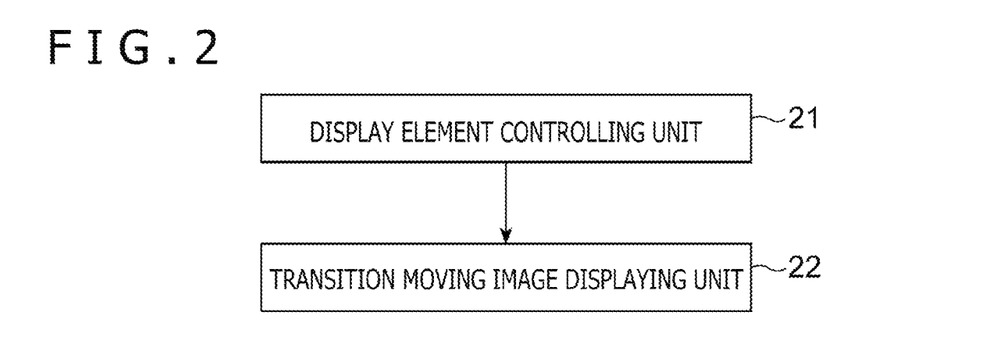
FIG. 2 is a functional block diagram depicting functions of the information processing apparatus according to the embodiment of the present invention.

In the following, functions implemented by the information processing apparatus 1 are described with reference to FIG. 2. As depicted in FIG. 2, the information processing apparatus 1 includes functions of a display element controlling unit 21 and a transition moving image displaying unit 22. These functions are implemented by operation of the control unit 11 according to a program stored in the storage unit 12. This program may be provided to the information processing apparatus 1 through a communication network such as the Internet or may be provided as a computer-readable information storage medium such as an optical disc in which the program is stored.

The display element controlling unit 21 creates a screen image including one or a plurality of display elements and causes the display apparatus 14 to display the screen image in a display area of the display apparatus 14. It is assumed that, in the present embodiment, any display element displayed by the display element controlling unit 21 includes a target display element E that becomes a target of transition control hereinafter described.

Here, it is assumed that the target display element E is a display element that becomes a target of an operation by a user. In particular, it is assumed that, if a user performs a predetermined operation input to the operation device 15, then the display element controlling unit 21 causes the display state of the target display element E to transit from a certain state to a different state.

The transition of a display element in the present embodiment indicates that the state of the display element on a screen changes and includes at least any one of movement of the display element on the screen (change in position), magnification or contraction (change in magnitude), and deformation (change in shape). It is to be noted that the target display element E may perform transition including any combination of them. For example, the display element controlling unit 21 may perform transition for changing the position and the magnitude of the target display element E at the same time according to an instruction from the user.

In a case where the display element controlling unit 21 accepts an instruction from the user for causing a target display element E to transit in a state in which the target display element E is displayed on the screen, it determines a state of the target display element E after transition. In the following description, a state of the target display element E before transition is referred to as an initial state, and a state of the target display element E after the transition is referred to as a target state.

Figure 3:
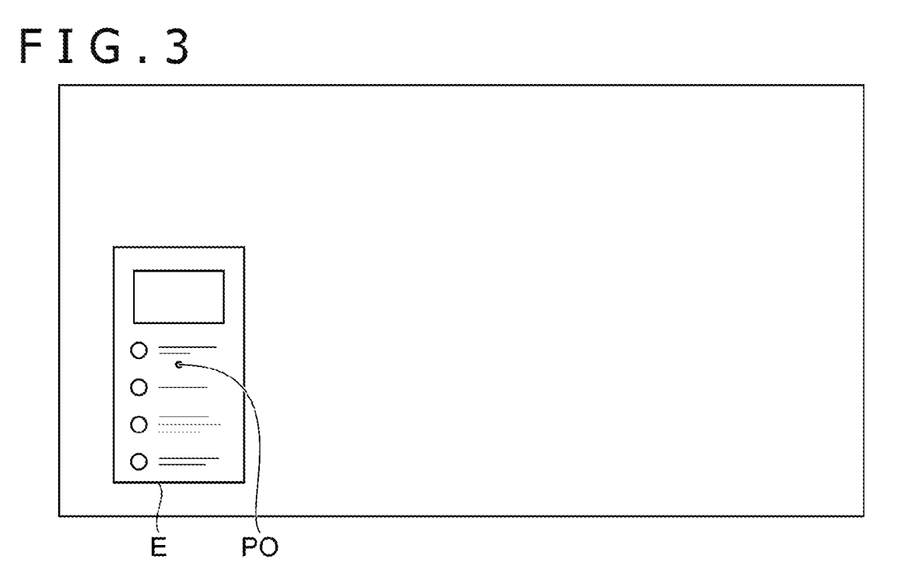
FIG. 3 is a view depicting an example of an initial state in a case where a transition moving image in which a target display element is moved is displayed.
Figure 4:
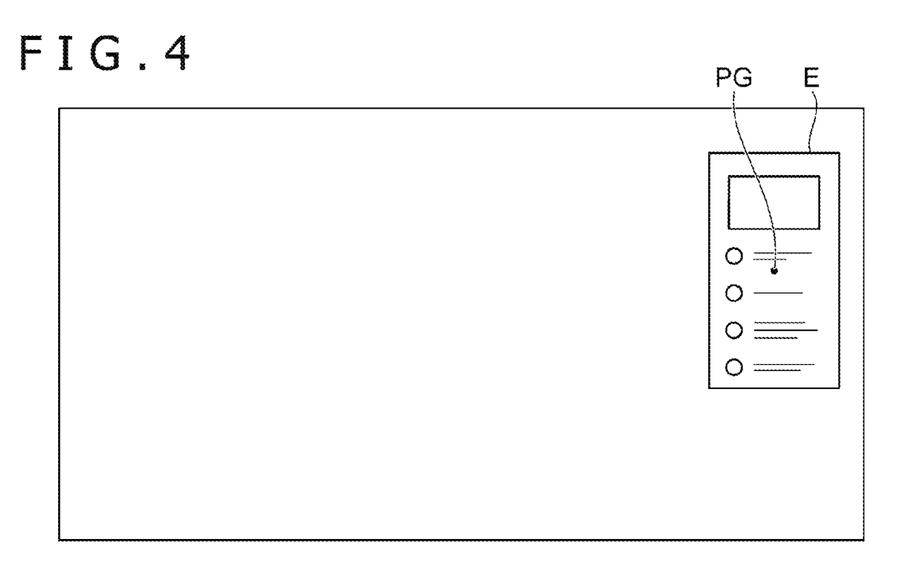
FIG. 4 is a view depicting an example of a target state in a case where a transition moving image in which a target display element is moved is displayed.

FIGS. 3 and 4 are views depicting an example of the initial state and the target state of the target display element E, FIG. 3 depicts the initial state and FIG. 4 depicts the target state. In the example of FIG. 3, it is assumed that the target display element E is a sub window that includes information to be presented to a user, and in the initial state, the target display element E is placed at a position PO in the proximity of the left lower corner of the screen. Here, in a case where the user performs an operation for the operation device 15 to instruct change of the placement position of the target display element E, the display element controlling unit 21 determines a placement position of the target display element E after the change as the target state. In the example of FIG. 4, it is assumed that the target display element E after transition is displayed at a position PG in the proximity of the upper right corner of the screen.

After the display element controlling unit 21 determines the target state of the target display element E, it requests the transition moving image displaying unit 22 to display a moving image indicating a procedure of transition from the initial state to the target state.

The transition moving image displaying unit 22 creates a moving image indicating a procedure of transition of the target display element E from the initial state to the target state according to the request from the display element controlling unit 21 and causes the display apparatus 14 to display the moving image. In the following description, the moving image indicative of a transition procedure is referred to as a transition moving image.

The transition moving image in the present embodiment is a moving image indicating a procedure of change of the target display element E immediately after the start of transition and a procedure of change of the target display element E immediately before the end of the transition and is a moving image in which an intermediate procedure between them is omitted. In other words, the transition moving image is a moving image indicating a procedure of only part of a first stage and part of a last stage of all procedures of change from the initial state to the target state.

In particular, the transition moving image displaying unit 22 determines, as a state on the way of a procedure of change from the initial state to the target state, a first intermediate state closer to the initial state than the target state and a second intermediate state closer to the target state than the initial state. Then, the transition moving image displaying unit 22 successively displays, as a transition moving image, the first moving image indicating a procedure of change from the initial state to the first intermediate state and the second moving image indicating a procedure of change from the second intermediate state to the target state. In other words, the procedure of change from the first intermediate state to the second intermediate state is not included in the transition moving image and is not displayed on the screen. Consequently, it is possible to allow the user to feel that, in comparison with an alternative case in which a moving image that indicates all procedures of change from the initial state to the target state is displayed, the transition is performed rapidly and the response to an operation is quick.

Figure 5:
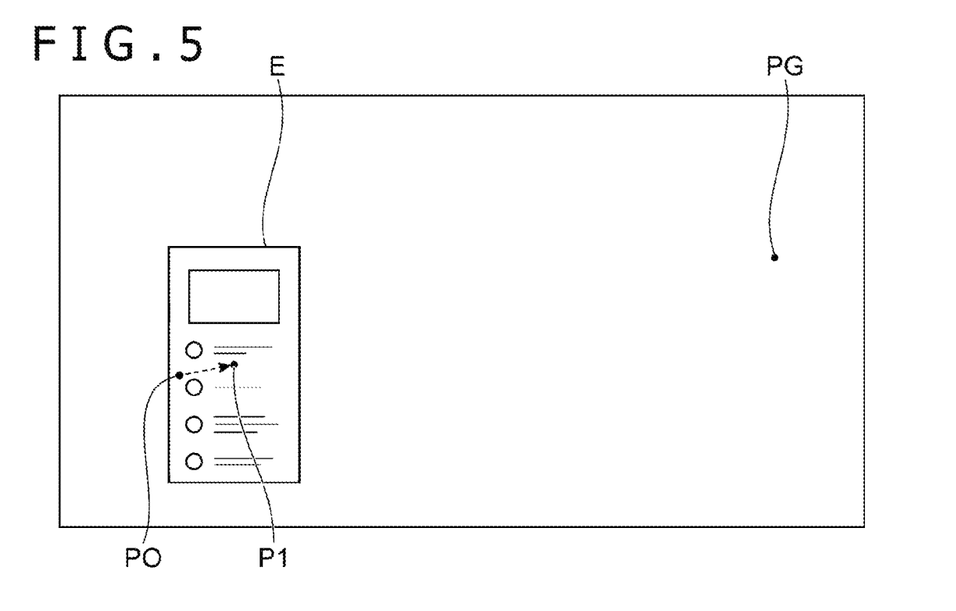
FIG. 5 is a view depicting an example of a first intermediate state in a case where a transition moving image in which a target display element is moved is displayed.
Figure 6:
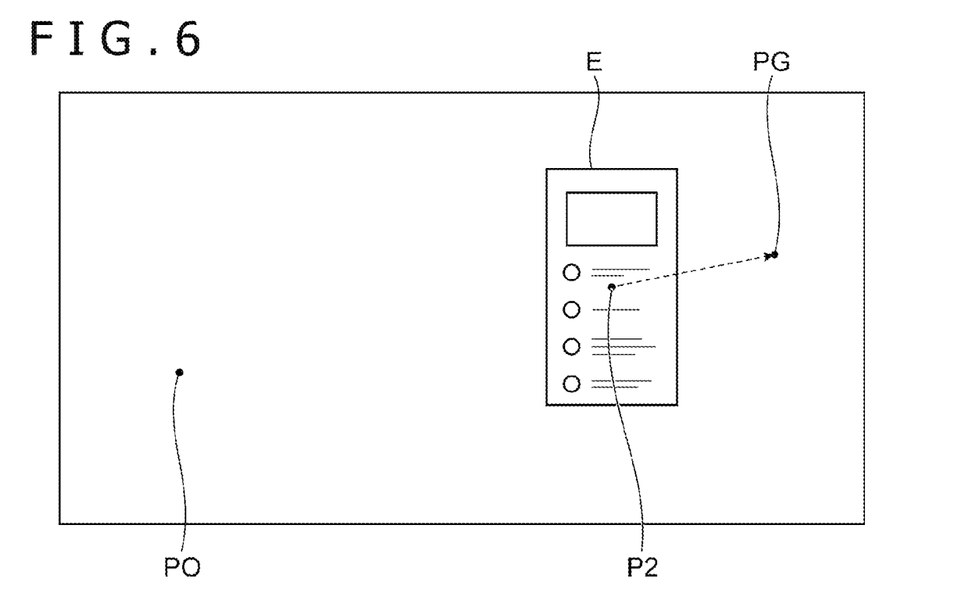
FIG. 6 is a view depicting an example of a second intermediate state in a case where a transition moving image in which a target display element is moved is displayed.

FIGS. 5 and 6 depict a particular example of the first intermediate state and the second intermediate state in a procedure in which a transition moving image is displayed. In FIGS. 5 and 6, display examples on the way of change of the transition moving image that indicates a manner in which the target display element E moves from the position PO in the initial state depicted in FIG. 3 to the position PG in the target state. In particular, the first intermediate state is a state in which the target display element E is displayed at a position P1 closer to the position PO in the first state than to the position PG in the target state, and the second intermediate state is a state in which the target display element E is displayed at a position P2 closer to the position PG in the target state than to the position PO in the initial state.

In FIGS. 5 and 6, an arrow mark of a broken line indicates a locus of movement of the target display element E in the display of the transition moving image. In particular, the first moving image is a moving image that indicates a procedure of movement of the target display element E from the position PO in the initial state to the position P1 in the first intermediate state, and an arrow mark of a broken line in FIG. 5 indicates a locus of movement of the target display element E in the display of the first moving image. Similarly, the second moving image is a moving image that indicates a procedure of movement of the target display element E from the position P2 in the second intermediate state to the position PG in the target state, and an arrow mark of a broken line in FIG. 6 indicates a locus of movement of the target display element E in the display of the second moving image. Since the procedure of change from the first intermediate state to the second intermediate state is not included in the transition moving image as described above, after the display of the first moving image comes to an end and the first intermediate state depicted in FIG. 5 is entered, the display immediately switches to the second intermediate state depicted in FIG. 6, and display of the second moving image is started. In short, the transition moving image in the present example is a moving image that indicates a procedure of movement of the target display element E from the position PO to the position P1 and then from the position P2 to the position PG.

Furthermore, in FIGS. 5 and 6, the position P1 in the first intermediate state and the position P2 in the second intermediate state are placed on a line segment that interconnects the position PO in the initial state and the position PG in the target state. Therefore, the direction of movement of the first moving image from the position PO in the initial state to the position P1 in the first intermediate state and the direction of movement from the position P2 in the second intermediate state to the position PG in the target state coincide with each other. By successively displaying a procedure in which the same target display element E moves in the same direction in this manner, although the procedure of movement from the position P1 to the position P2 is omitted, the user can recognize that the first moving image and the second moving image indicate a continuous change and can grasp that the target display element E has transited from the initial state to the target state without having an uncomfortable feeling.

It is to be noted that the first moving image and the second moving image may not be moving images for a same period of time. In order to induce a user to pay attention to the target state, it is desirable to make the second moving image easier to catch the eye of the user than the first moving image. To this end, for example, the speed of movement of the target display element E in the second moving image (namely, the speed of change of the target display element E) may be made lower than the speed of movement in the first moving image to make a period of time for which the second moving image is displayed longer than a period of time for which the first moving image is displayed. Here, each speed of movement of the target display element E in the first moving image and the second moving image may not be fixed, and for example, the speed of movement of the target display element E may be controlled such that the target display element E is gradually accelerated in the first moving image but is gradually decelerated in the second moving image.

Moreover, the transition moving image displaying unit 22 may make the display time period of the second moving image longer by making the distance of movement of the target display element E in the second moving image (namely, the amount of change of the target display element E) longer than the distance of movement in the first moving image. This can be implemented by making the distance between the position P2 and the position PG longer than the distance between the position PO and the position P1.

Further, the transition moving image displaying unit 22 may display a preliminary moving image at the start of display of a transition moving image prior to display of a first moving image. This preliminary moving image is a moving image in which the target display element E is changed a little in a direction opposite to the direction of change from the initial state to the target state. For example, in the example of FIG. 3, a preliminary moving image in which the target display element E is moved once in a direction in which it is spaced away from the position PG in the target state from the start point given by the position PO in the initial state may be displayed. Thereafter, the transition moving image displaying unit 22 displays a first moving image that indicates a procedure of movement of the target display element E in a direction in which the target display element E approaches the position PG in the target state from the start point given by the position at the point of time at which the display of the preliminary moving image comes to an end (position on the opposite side to the position PG in the target state with respect to the position PO in the initial state). Further, after this, a second moving image similar to that in the example described hereinabove is displayed. In particular, the transition moving image in this example is a moving image that includes the preliminary moving image, the first moving image, and the second image in this order. This makes it possible to further emphasize the transition of the target display element E.

Figure 7:
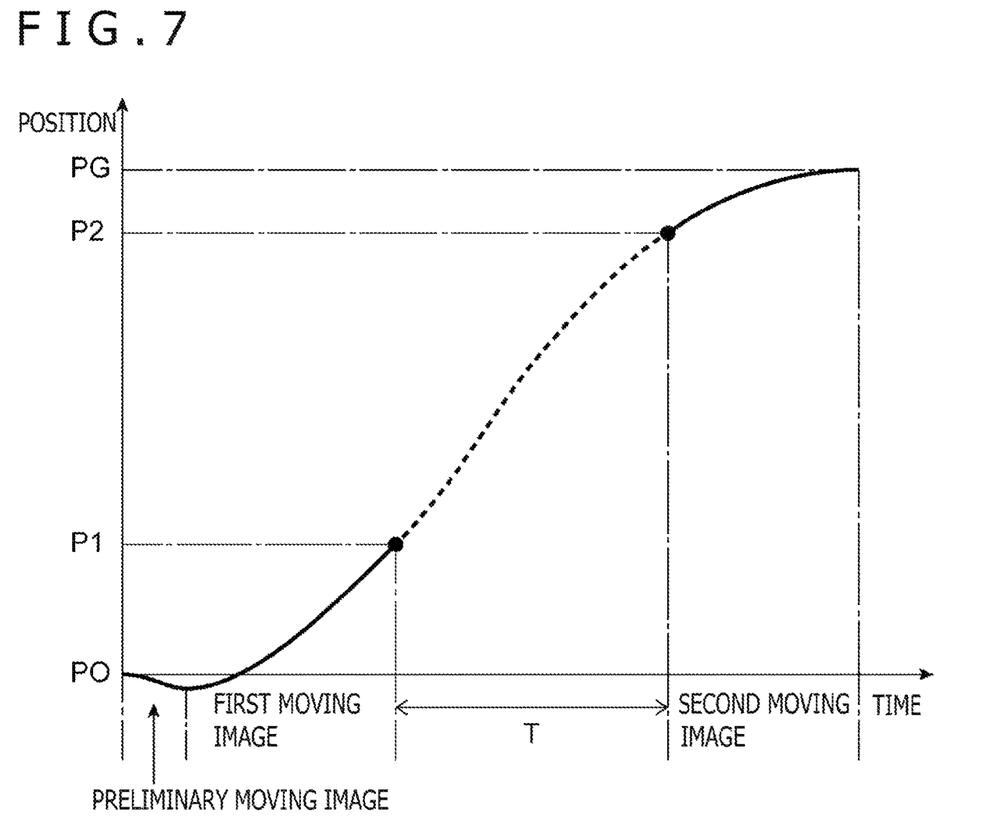
FIG. 7 is a diagram depicting a change in position of a target display element while a transition moving image is displayed.

FIG. 7 is a diagram illustrating a change of the position of the target display element E while the transition moving image is displayed in a case where such a preliminary moving image as described above is displayed. In FIG. 7, the axis of ordinate indicates the position of the target display element E with respect to the origin given by the position PO in the initial state. The axis of abscissa indicates a time change in a case where a moving image in which the target display element E is moved to transit from the initial state to the target state without omitting the movement of the target display element E during a period of time from the first intermediate position to the second intermediate position as described hereinabove. The inclination of a solid line in FIG. 7 indicates a speed of movement of the target display element E.

As depicted in FIG. 7, in a case where the target display element E is moved to transit from the initial state to the target state, after the target display element E is moved once in a direction in which it is spaced away from the position PG in the target state (in the negative direction of the axis of ordinate), the target display element E is moved toward the position PG while it is gradually accelerated. Then, after the speed of movement reaches the highest speed, the target display element E continues to move at a substantially fixed speed toward the position PG. Then, the target display element E finally reaches the position PG while it is gradually decelerated. This indicates a natural change in speed when an object moves after it moves by back action once.

In the present embodiment, the transition moving image displaying unit 22 omits display of a moving image corresponding to a portion indicated by a broken line in FIG. 7. Here, the position P1 in the first intermediate state preferably coincides with a timing at which the speed of movement of the target display element E reaches the highest speed or with a timing immediately preceding the timing. Since it is a typical phenomenon that, as the speed increases, the movement of the object becomes less likely to be caught by the eyes of human being, not displaying the target display element E in a state in which the target display element E is being accelerated in this manner causes a user to have less uncomfortable feeling, even if the procedure of the movement of the target display element E is omitted. In this case, while the first moving image is displayed, the speed of the movement of the target display element E continues to gradually increase. Further, the position P2 in the second intermediate state preferably coincides with a timing at which it starts deceleration or with a timing immediately preceding the timing. In this case, while the second moving image remains displayed, the speed of the movement of the target display element E continues to gradually decrease. It is to be noted that, at a timing at which the target display element E reaches the position PG in the target state, unlike a timing at the start of the movement, there is no necessity to display such a movement as to finally stop after movement in the reverse direction, which is reverse to the movement of the preliminary moving image.

It is to be noted that, although it is described in the foregoing description that, immediately after display of the first moving image comes to an end and the target display element E enters the first intermediate state, display of the second moving image is started from the second intermediate state, the transition moving image displaying unit 22 may otherwise provide an interval state in which the target display element E is not displayed for a given period of time such that display of the second moving image is started after the period of time for the interval state elapses. The period of time for the interval state in this case should be set so as not to exceed a period of time T corresponding to the portion indicated by the broken line in FIG. 7. In other words, it is preferable to set the period of time for the interval state shorter than the period of time required in a case where it is assumed that the target display element E is moved at a fixed speed to the second intermediate state, keeping a speed of movement at the timing at which the target display element E reaches the first intermediate state. This makes it possible to give the user such an impression that the target display element E transits rapidly.

In addition, although it is described in the foregoing description that contents of the target display element E do not change between the initial state and the target state and, when the transition moving image displaying unit 22 displays a transition moving image, it continues to display the target display element E of the same contents from the start to the end of the display. However, the transition moving image displaying unit 22 may be configured such that contents of the target display element E also change together with transition of the state. For example, in a case where the user performs an operation for the instruction to display new information, it is necessary to change the display position of the target display element E and change contents of the display such that the target display element E includes the new information. In this case, contents of the target display element E differ between the initial state and the target state. If it is assumed that, in such a case as just described, all procedures of gradual movement of the target display element E from the initial state to the target state are displayed, it is necessary to switch contents of the target display element E at some timing in the procedures. This may give the user such an impression that contents of the target display element E change suddenly, resulting in possibility that the user may have an uncomfortable feeling.

To address this problem, the transition moving image displaying unit 22 may be configured so as to display, in the first moving image, the target display element E with display contents same as those in the initial state and to display, in the second moving image, the target display element E with display contents same as those in the target state. In particular, the transition moving image displaying unit 22 newly draws contents of the target display element E to be displayed after state transition at a timing at which display of the second moving image is started and displays the second moving image indicating a manner in which the newly drawn target display element E moves to the position PG in the target state. Since this switches contents of the display at a timing at which the target display element E moves (discontinuously) to the second intermediate state far away from the first intermediate state, the user is less likely to have an uncomfortable feeling.

It is to be noted that, in a case where such control as described above is performed, drawing of the target display element E before the start of transition and during display of the first moving image and drawing of the target display element E after the completion of transition and during display of the second moving image may be implemented by programs different from each other. As an example, the target display element E before the start of transition and during display of the first moving image may be drawn by a system program, and the target display element E after the completion of transition and during display of the second moving image may be drawn by a game program.

Further, when the first moving image is displayed, the transition moving image displaying unit 22 may gradually change the position of the target display element E and perform image processing for gradually making the target display element E less conspicuous by gradually raising the transparency or gradually decreasing the brightness of the target display element E itself. In this case, the transition moving image displaying unit 22 may perform, for the second moving image, image processing for gradually making the target display element E conspicuous to a state in which the target display element E is finally displayed in an ordinary way, unlike the first moving image, by gradually decreasing the transparency from a state in which the transparency is high or gradually increasing the brightness from a state in which the brightness is low. By such control as just described, it is possible to make a discontinuous change from the first intermediate state to the second intermediate state less conspicuous and make the user less likely to have an uncomfortable feeling.

Although the foregoing description is given of an example of a transition moving image in which the target display element E is moved, this is not restrictive, and the transition moving image displaying unit 22 can display a transition moving image in which an intermediate procedure is omitted similarly also in a case where a change of any other type is caused. In the following, examples in which transition for magnifying the target display element E are described with reference to FIGS. 8 to 11.

Figure 8:
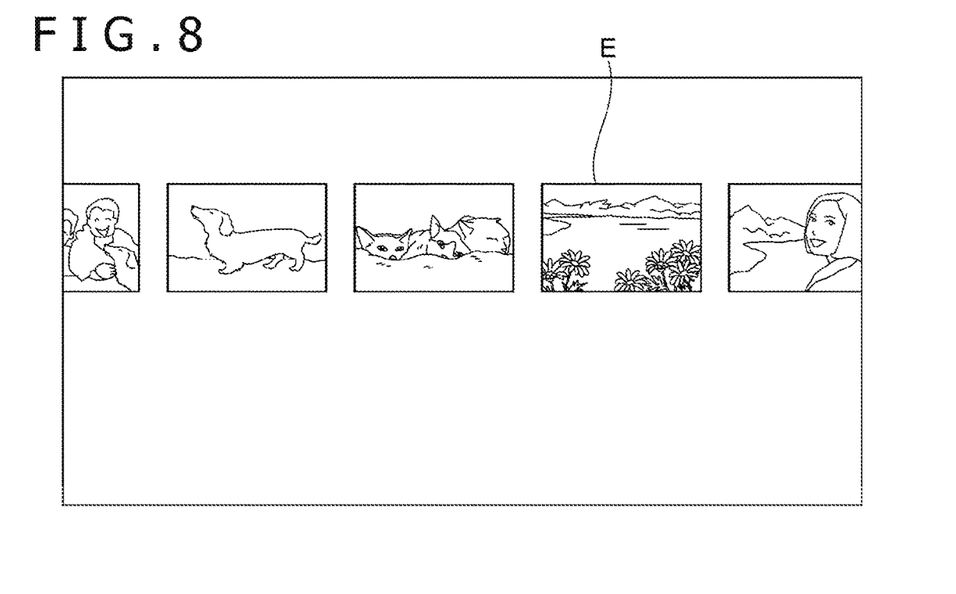
FIG. 8 is a view depicting an example of an initial state in a case where a transition moving image in which a target display element is magnified is displayed.
Figure 9:
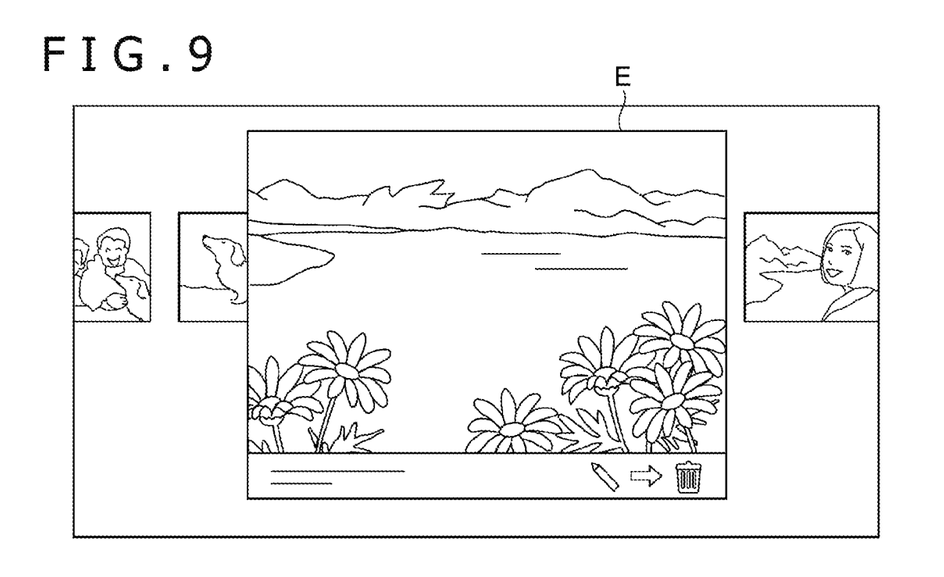
FIG. 9 is a view depicting an example of a target state in a case where a transition moving image in which a target display element is magnified is displayed.

FIG. 8 depicts an example of a display of the target display element E in the initial state. In the example of FIG. 8, a plurality of thumbnail images are displayed side by side as display elements, and in a case where a user performs an operation for selecting any one of them, the selected thumbnail image is determined as the target display element E, and the display transits to a state in which an image magnified from the thumbnail image is displayed. FIG. 9 depicts an example of a display of the target display element E in the target state. In the example of FIG. 9, it is assumed that detailed information, an operation button, and the like regarding the selected image are added to the target display element E in the target state and that contents of the display have changed from the target display element E (thumbnail image) in the initial state. Also, in the example of FIG. 9, since, in the target state, the target display element E is displayed at the center of the screen, not only the size but also the position of the target display element E on the screen has changed together with the transition of the state.

In this example, if the user performs a selection operation of the target display element E in the state of FIG. 8, then the transition moving image displaying unit 22 displays a first moving image in which the target display element E is magnified from the initial state to the first intermediate state and then displays the second moving image in which the target display element E is magnified from the second intermediate state to the target state. Then, the display finally transits to the display of the target state depicted in FIG. 9. Here, the first intermediate state is a state in which the target display element E is displayed with a size that is greater than that in the initial state and besides is smaller than that in the second intermediate state, and the second intermediate state is a state in which the target display element E is displayed with a size that is greater than that in the first intermediate state and besides is smaller than that in the target state.

Figure 10:
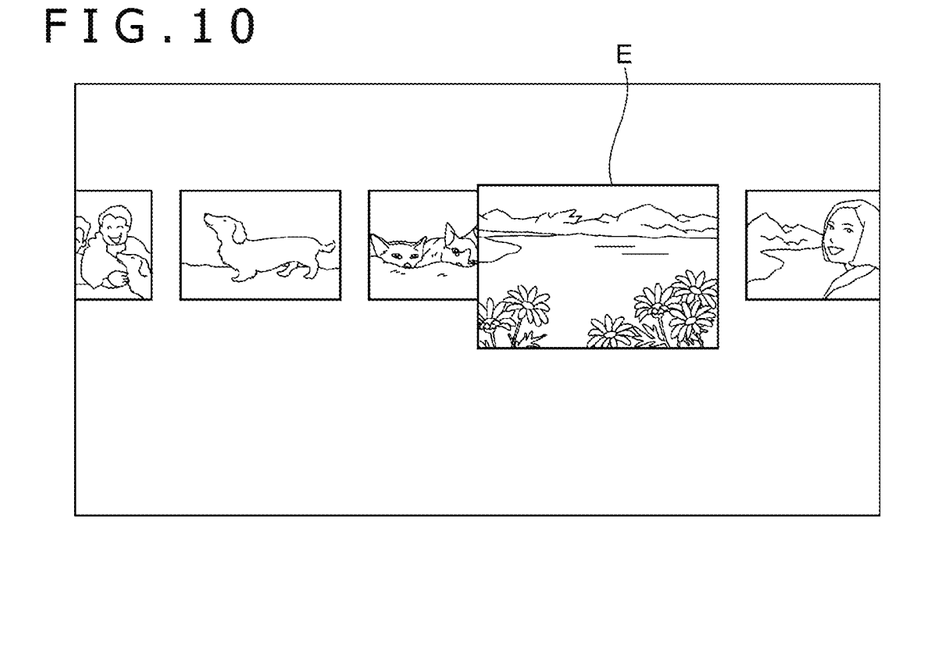
FIG. 10 is a view depicting an example of a first intermediate state in a case where a transition moving image in which a target display element is magnified is displayed.
Figure 11:
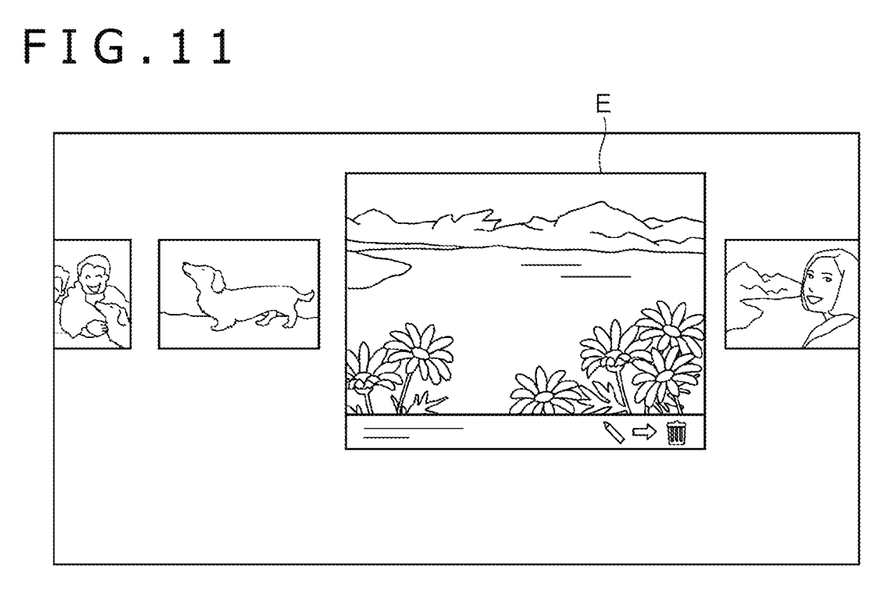
FIG. 11 is a view depicting an example of a second intermediate state in a case where a transition moving image in which a target display element is magnified is displayed.

FIG. 10 depicts an example of a display in the first intermediate state, and FIG. 11 depicts an example of a display in the second intermediate state. As depicted in FIGS. 10 and 11, the target display element E in the first intermediate state in FIG. 10 is same in contents of display as that in the initial state depicted in FIG. 7, and the target display element E in the second intermediate state in FIG. 11 is same in contents of display as that in the target state depicted in FIG. 8. In other words, contents of the display of the target display element E are changed at a timing at which the display switches from the first intermediate state to the second intermediate state.

Also in the examples of FIGS. 10 and 11, by omission of the display of the state between the first intermediate state and the second intermediate state, an impression that state transition according to an operation of the user has been performed rapidly can be given to the user. On the other hand, by displaying a manner in which the target display element E starts magnification from the initial state is displayed as the first moving image and then a manner in which the target display element E is magnified subsequently to perform display of the target state is displayed as the second moving image, the user can easily grasp that the original state of the target display element E has transited to a display of the target state.

It is to be noted that, also in the examples of FIGS. 10 and 11, the amount of change in the second moving image may be made greater than that in the first moving image or the speed of change in the second moving image may be made lower than the speed of change in the first moving image similarly as in the example of the transition moving image described hereinabove in which the target display element E is moved. Further, prior to the first moving image, a preliminary moving image that indicates a manner in which the target display element E contracts a little from the initial state may be included in the transition moving image.

Also in a case where the target display element E that has not been displayed until then is to be displayed newly on the screen, the transition moving image displaying unit 22 may display a transition moving image similar to any of those described hereinabove. In this case, the initial state is a state in which the target display element E is not displayed, and it is assumed that the transition moving image displaying unit 22 displays a transition moving image that includes a first moving image in which the target display element E is magnified from the size 0 to the first intermediate state and a second moving image in which the target display element E is magnified from the second intermediate state to the final target state. This makes it possible to present a window, which is to be displayed newly in a case in which a popup display of a window is to be performed in response to an operation of the user, in an easy-to-understand manner to the user.

Further, the target display element E in the initial state and/or the target state may be displayed only at part thereof on the screen. For example, the transition moving image displaying unit 22 may display a transition moving image in which, starting from an initial state in which, although part of the target display element E is displayed on the screen, it is not entirely displayed, the display transits to the target state in which the target display element E is displayed entirely on the screen.

The transition moving image displaying unit 22 may not always display a transition moving image in which such an intermediate procedure of change as described above is omitted. For example, in a case where the degree of change by a state transition is low (in a case where the distance of movement is small, for example), the transition moving image displaying unit 22 may display a transition moving image that includes all procedures of change from the initial state to the target state without omitting an intermediate procedure.

As described above, with the information processing apparatus 1 according to the present embodiment, a state transition according to an operation of a user can be presented in an easy-to-understand manner and besides in a high responsiveness to the user.

It is to be noted that the embodiment of the present invention is not limited to that described above. The state transitions of the target display element E in the foregoing description are mere examples, and the information processing apparatus 1 according to the embodiment of the present invention may display such a transition moving image as described above in regard to various state transitions of the target display element E.

REFERENCE SIGNS LIST

1: Information processing apparatus
11: Control unit
12: Storage unit
13: Interface unit
14: Display apparatus
15: Operation device
21: Display element controlling unit
22: Transition moving image displaying unit

The invention claimed is:

1. An information processing apparatus in which a display element displayed on a screen of a display apparatus is caused to transit from an initial state to a target state, comprising:
   circuitry configured to:
   determine a target state of the display element after transition according to an operation of a user; and
   display a transition moving image that indicates a procedure of change of the display element from the initial state to the determined target state, wherein:
   the transition moving image is a moving image that includes a procedure of change of the display element from the initial state to a first intermediate state and a procedure of change of the display element from a second intermediate state to the target state and that does not include a procedure of change of the display element from the first intermediate state to the second intermediate state; and
   the procedure of change of the display element from the initial state to the first intermediate state and the procedure of change of the display element from the second intermediate state to the target state are such that:
   (i) an initial size of the display element in the initial state is different than a target size of the display element in the target state, an initial position of the display element in the initial state is different than a target position of the display element in the target state, or both,
   (ii) a first intermediate size of the display element in the first intermediate state is between the initial size and a second intermediate size of the display element in the second intermediate state, a first intermediate position of the display element in the first intermediate state is between the initial position and a second intermediate position of the display element in the second intermediate state, or both,
   (iii) the second intermediate size of the display element in the second intermediate state is between the first intermediate size and the target size, the second intermediate position is between the first intermediate position and the target position, or both,
   (iv) a process of changing from the initial state to the first intermediate state in the transition moving image is such that a current position of the display element, a current size of the display element, or both continuously changes from the initial state toward the first intermediate state, and
   (v) a process of a changing from the second intermediate state to the target state in the transition moving image is such that the current position of the display element, the current size of the display element, or both continuously changes from the second intermediate state toward the target state.

2. The information processing apparatus according to claim 1, wherein the transition moving image is a moving image in which a speed of the change of the display element from the second intermediate state to the target state is lower than a speed of the change of the display element from the initial state to the first intermediate state.

3. The information processing apparatus according to claim 1, wherein the transition moving image is a moving image in which an amount of the change of the display element from the second intermediate state to the target state is greater than an amount of the change of the display element from the initial state to the first intermediate state.

4. The information processing apparatus according to claim 1, wherein
   contents of display of the display element in the target state are different from contents of display of the display element in the initial state, and
   the transition moving image is a moving image that indicates the procedure of the change of the display element from the initial state to the first intermediate state with the contents of the display of the display element in the initial state and that indicates the procedure of the change of the display element from the second intermediate state to the target state with the contents of the display of the display element in the target state.

5. The information processing apparatus according to claim 1, wherein the transition moving image includes a procedure that is started, prior to the procedure of the change of the display element from the initial state to the first intermediate state, from the initial state to change in an opposite direction to that of the change of the display element from the initial state to the target state.

6. The information processing apparatus according to claim 1, wherein
   the target state is a state in which the display element is placed at a position different from a position in the initial state, and
   the transition moving image is a moving image that indicates a procedure of movement of the display element from the position in the initial state to the position in the target state.

7. The information processing apparatus according to claim 1, wherein the target state is a state in which the display element is displayed in size different from that in the initial state, and the transition moving image is a moving image that indicates a procedure of change of a size of the display element from a size of the display element in the initial state to a size of the display element in the target state.

8. An information processing method for moving a display element displayed on a screen of a display apparatus to cause the display element to transit from an initial state to a target state, comprising:

determining a target state of the display element after transition according to an operation of a user; and displaying a transition moving image that indicates a procedure of change of the display element from the initial state to the determined target state, wherein:

the transition moving image is a moving image that includes a procedure of change of the display element from the initial state to a first intermediate state and a procedure of change of the display element from a second intermediate state to the target state and that does not include a procedure of change of the display element from the first intermediate state to the second intermediate state; and the procedure of change of the display element from the initial state to the first intermediate state and the procedure of change of the display element from the second intermediate state to the target state are such that:

(i) an initial size of the display element in the initial state is different than a target size of the display element in the target state, an initial position of the display element in the initial state is different than a target position of the display element in the target state, or both, (ii) a first intermediate size of the display element in the first intermediate state is between the initial size and a second intermediate size of the display element in the second intermediate state, a first intermediate position of the display element in the first intermediate state is between the initial position and a second intermediate position of the display element in the second intermediate state, or both, (iii) the second intermediate size of the display element in the second intermediate state is between the first intermediate size and the target size, the second intermediate position is between the first intermediate position and the target position, or both, (iv) a process of changing from the initial state to the first intermediate state in the transition moving image is such that a current position of the display element, a current size of the display element, or both continuously changes from the initial state toward the first intermediate state, and (v) a process of a changing from the second intermediate state to the target state in the transition moving image is such that the current position of the display element, the current size of the display element, or both continuously changes from the second intermediate state toward the target state.

9. A non-transitory, computer readable storage medium containing a computer program, which when executed by a computer, causes the computer to perform a method for moving a display element displayed on a screen of a display apparatus to cause the display element to transit from an initial state to a target state, by carrying out actions, comprising:

determining a target state of the display element after transition according to an operation of a user; and displaying a transition moving image that indicates a procedure of change of the display element from the initial state to the determined target state, wherein:

the transition moving image is a moving image that includes a procedure of change of the display element from the initial state to a first intermediate state and a procedure of change of the display element from a second intermediate state to the target state and that does not include a procedure of change of the display element from the first intermediate state to the second intermediate state; and the procedure of change of the display element from the initial state to the first intermediate state and the procedure of change of the display element from the second intermediate state to the target state are such that:

(i) an initial size of the display element in the initial state is different than a target size of the display element in the target state, an initial position of the display element in the initial state is different than a target position of the display element in the target state, or both, (ii) a first intermediate size of the display element in the first intermediate state is between the initial size and a second intermediate size of the display element in the second intermediate state, a first intermediate position of the display element in the first intermediate state is between the initial position and a second intermediate position of the display element in the second intermediate state, or both, (iii) the second intermediate size of the display element in the second intermediate state is between the first intermediate size and the target size, the second intermediate position is between the first intermediate position and the target position, or both, (iv) a process of changing from the initial state to the first intermediate state in the transition moving image is such that current position of the display element, a current size of the display element, or both continuously changes from the initial state toward the first intermediate state, and (v) a process of a changing from the second intermediate state to the target state in the transition moving image is such that the current position of the display element, the current size of the display element, or both continuously changes from the second intermediate state toward the target state.

* * * * *